United States Patent Office 2,769,497
Patented Nov. 6, 1956

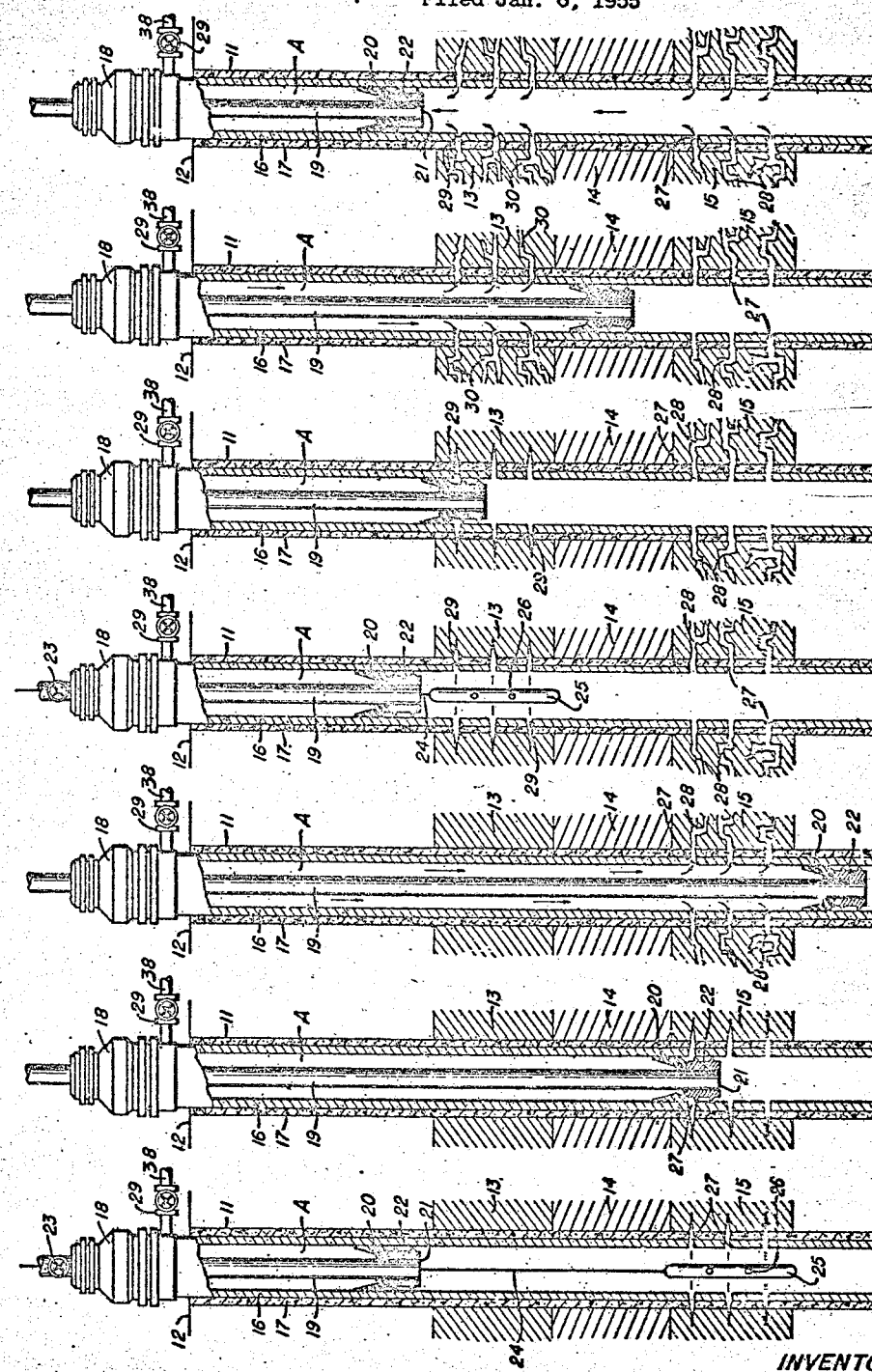

2,769,497
METHOD FOR TREATING HYDROCARBON PRODUCING FORMATIONS

Carl E. Reistle, Jr., Houston, Tex., assignor, by mesne assignments, to Esso Research and Engineering Company, Elizabeth, N. J., a corporation of Delaware Application January 6, 1955, Serial No. 480,209

4 Claims. (Cl. 166—42)

The present invention is directed to a method for treating productive formations. More particularly, the invention is directed to a method for selectively treating a plurality of hydrocarbon productive intervals. In its more specific aspects, the invention has to do with selectively increasing the permeability of a plurality of hydrocarbon productive intervals.

The present invention may be briefly described as a method for selectively increasing the permeability or productivity of a plurality of hydrocarbon productive intervals penetrated by a well bore. Briefly, the invention involves perforating a first hydrocarbon productive interval penetrated by a well bore to open up the first hydrocarbon productive interval into the well bore. The perforated interval is then isolated from the remainder of the well bore and the perforated interval is then treated by contacting same with a reagent to increase the permeability or productivity of the perforated first interval. Thereafter, a second hydrocarbon productive interval which may be vertically spaced from the first hydrocarbon productive interval is perforated and then isolated from the remainder of the well bore. The isolated second productive interval after perforation is then treated by contacting same with a reagent to increase the permeability or productivity of the isolated perforated second interval.

The permeability or productivity of the perforated intervals may be increased preferably by contacting same with a fracturing fluid under pressure sufficient to fracture the formation whereby the permeability or productivity of the formation is increased. The permeability or productivity of the isolated intervals may be increased also by treatment with acid, hydrocarbon under pressure, or by treatment with an acid gel, a water gel or a hydrocarbon gel.

When a fracturing fluid is used, this fracturing fluid may suitably be a hydrocarbon, which may be crude petroleum, kerosene, acid gel, and the like, and may contain bodying agents and/or propping agents, such as of the nature of sand and the like, to lodge in crevices and cracks formed by the high pressure treatment to maintain the crevices or cracks open to allow oil to drain and/or be produced from the well bore.

The present invention is particularly applicable in well bores having a casing arranged therein which penetrates a plurality of hydrocarbon productive intervals, formations, zones or strata. Frequently the oil productive intervals overlie one another and may be separated by non-productive intervals. When conventional treatment is employed for the plurality of intervals heretofore the interval less resistant to treatment has had its permeability or productivity increased while those less susceptible to the treatment were not increased in permeability or productivity. One zone would be treated at the expense of others. Thus in producing oil from underground formations, strata and the like, frequently strata are encountered which contain commercial quantities of hydrocarbons but their permeabilities may be too low to permit producing such hydrocarbons at rates which would make the operation economically attractive. As pointed out, increasing the permeability or productivity of the hydrocarbon-containing strata by stimulating methods, such as by fracturing treatment or by acidizing, has resulted in the formations or strata which are structurally weakest or reactive with the acid to be treated where the formations that are structurally strongest or less reactive with the acid to resist the treatment and not respond as much as those that are less strong and more reactive. Thus, when the plurality of hydrocarbon productive intervals have been treated in the past only one of a plurality of intervals has responded as the rest of the hydrocarbon productive intervals have had no effective treatment given thereto.

In accordance with the present invention, any one or all of a desired number of hydrocarbon productive intervals may be treated or fractured for simultaneous or sequential production of hydrocarbons by increasing the permeability or productivity thereof selectively. In accordance with the present invention, isolation and fracturing of the plurality of hydrocarbon intervals penetrated by a well bore is possible without making it necessary to kill the well and avoiding round trips into the well.

The present invention will be more completely described by reference to the drawing in which:

Figs. 1 to 7 are a stepwise illustration of the present invention.

Referring now to the drawing and particularly to Fig. 1, a well bore 11 has been drilled from the earth's surface 12 to penetrate a plurality of intervals 13, 14, 15 of which intervals 13 and 15 are hydrocarbon productive.

The well bore 11 has a casing 16 arranged therein and cemented in place with primary cement 17. Run into the casing through a wellhead arrangement 18 is a tubing string 19 which has arranged on its lower end a packer 20 which will resist flow downwardly in the annulus A between the casing 16 and the tubing 19 but will allow flow upwardly past the packer 20. Carried on the lower end 21 of the tubing 19 is a casing burr remover 22 which is designed to remove burrs and obstructions from the interior wall of casing 16. The tubing 19 is provided with a lubricator 23 to allow running into the tubing 19 and lowering therethrough on a wire line 24 a gun perforator 25 which may be of the shaped charge or bullet gun type.

In Fig. 1 the gun perforator 25 has been lowered through the tubing 19 adjacent the hydrocarbon productive interval 15 and the shaped charges, such as 26, fired to form perforations 27 through the casing 16 and cement 17 and to perforate the formation or interval 15.

It will be noted that communication is had to the annulus A by means of a conduit 28 controlled by a valve 29.

Referring now to Fig. 2, the tubing 19 carrying the packer 20 and the burr remover 22 is then manipulated in the casing 16 downwardly, such that the burr remover 22 removes all burrs and protuberances from the interior wall of the casing 16 such that the packer 20 may slide easily therethrough.

As shown more clearly in Fig. 3, the packer 20 is arranged below the perforated interval to isolate the lower portion of the casing 16 from the remainder of the well bore, the burr remover 22 having been carried downwardly in the casing to provide a free smooth path for the packer 20. The perforated interval 15 is then treated by flowing a treating reagent, such as a fracturing fluid which may be crude oil carrying finely divided particulate material, such as sand; pressure is then imposed on the fracturing fluid in the casing annulus sufficient to crack or fracture the formation 15 and to form laterally and vertically extending fractures, such as 28, which serve to increase the permeability or productivity of the hydrocarbon productive interval 15. The flow of the fracturing fluid or treating reagent is as indicated by the arrows.

Referring now to Fig. 4, after the pressure has been exerted on the interval 15 for a sufficient length of time to form the fractures 28, fluid pressure is released from the annulus A by opening the valve 29. Thereafter, the tubing 19 is raised again in the casing 16 until the packing member 20 and the burr remover 22 are above the hydrocarbon productive interval 13. The gun perforator 25 attached to wire line 24 is lowered again through the lubricator 23 until the gun perforator 25 is adjacent hydrocarbon productive interval 13. The gun perforator 25 is operated to form perforations 27 through the casing 16 and primary cement 17 and to penetrate the hydrocarbon productive interval 13.

The gun perforator 25 is then withdrawn by reeling in the wire line 24 and removing same from tubing 19 through lubricator 23. As shown more clearly in Fig. 5, the tubing 19 is then lowered in the casing 16 such that the burr remover 22 may form a smooth surface for the packer 20 in the perforated interval 13 of the casing 16. The tubing is then lowered until the lower end 21 thereof is below the perforated interval 13 such that the packer 20 isolates the perforated interval 13 from the remainder of the well casing 16. The valve 29 in conduit 38 is then opened and a treating reagent, such as a fracturing fluid, is introduced into the casing annulus A and a sufficient amount of pressure to crack the interval 13 is imposed on the interval 13 through the perforations 29 in the well casing 16 to form lateral and vertical crevices or cracks or fractures 30 in the interval 13. After the pressure has been supplied a sufficient amount of time to crack or fracture the interval 13 as indicated by a decrease of the pump pressure, the pressure is then relieved on the annulus A. The tubing 19 is then raised to a position as shown in Fig. 7 so that the lower open end 21 is above the fractured interval 13. Production of oil and/or gas may then be obtained from hydrocarbon productive intervals 13 and 15. The above-outlined treatment of perforating, isolating, and contacting, such as by imposing pressure on a treating reagent, may be performed on each of the plurality of hydrocarbon productive intervals whose permeability or productivity is to be increased.

It is contemplated that the practice of the present invention is subject to many variations and modifications coming within the purview of the appended claims. Thus, it is contemplated that the production of hydrocarbons may be had either simultaneously or sequentially from a plurality of treated hydrocarbon intervals. For example, it may be desirable to obtain production simultaneously from intervals 13 and 15 or it may be desirable to obtain production first from interval 15 by placing the open end 21 of the tubing above the interval 15 and closing off the casing-tubing annulus A and allowing production to be had into the casing 16 and thence upwardly to the tubing 19 or it may be desirable to isolate the treated formation 15 by replacing the packer 20 with a downwardly facing cup packer which will serve to isolate the annulus below the interval 13 and, then by closing off the tubing 19, production may be had up the annulus A from the interval 13.

It is within the purview of the present invention to increase the permeability or productivity of the formation, zones, intervals, stratum and the like by treatment with acid, acid gel, gelled water, hydrocarbon or hydrocarbon-containing bodying agent such that the formation permeability or productivity is increased by physical cracking or fracturing of the formation or by reaction of a chemical reagent, such as acid, with the formation and/or interval material.

Likewise, it is contemplated that after the permeability or productivity of the several intervals has been increased, fluid may be introduced into the intervals of increased permeability or productivity to allow recovery of hydrocarbons and the like. For example, the permeability or productivity of the formations or zones may be increased and well stimulation practiced by introducing hydrocarbons, gas, or water into the interval whose permeability or productivity has been increased in accordance with the present invention.

It may be seen that the present invention is quite useful in well treating and stimulating operations in that the permeability or productivity of a plurality of hydrocarbon productive intervals may be increased and production then had from the so-treated intervals by providing a pressure differential into the well bore such that hydrocarbons are flowed therein.

The invention is of great utility in that perforation, isolation and fracturing or treating of each individual stratum in a plurality of strata may be performed without requiring withdrawing of the tubing from the well bore between such individual operation and without requiring the well to be killed or controlled to the extent that no pressure is on the wellhead during the several operations of the present invention.

The present invention also obviates the necessity of many round trips as is required in conventional treatment of wells. By round trips is meant a trip into the well with the tubing and then coming out of the well with the tubing.

The nature and objects of the present invention having been completely described and illustrated, what I wish to claim as new and useful and to secure by Letters Patent is:

1. A method for selectively increasing the permeability of a plurality of hydrocarbon productive intervals penetrated by a well bore having a tubing arranged therein which comprises perforating a first hydrocarbon productive interval, sealing off the annulus between said tubing and said well bore below said productive interval, imposing fluid pressure on said perforated first interval sufficient to fracture said first interval perforating a second hydrocarbon productive interval, sealing off the annulus between said tubing and said well bore below said second productive interval and then imposing fluid pressure on said second perforated interval sufficient to fracture said second interval.

2. A method for selectively increasing the permeability of a plurality of hydrocarbon productive intervals penetrated by a cased well bore having a tubing arranged therein which comprises perforating a first hydrocarbon productive interval, sealing off the annulus between said tubing and said casing below said first productive interval from downward fluid flow therethrough, imposing fluid pressure in said annulus sufficient to fracture said first interval, perforating a second hydrocarbon productive interval, sealing off the annulus between said tubing and said casing below said second productive interval from downward fluid flow therethrough and then imposing fluid pressure in said annulus sufficient to fracture said perforated second interval.

3. A method for selectively increasing the permeability of a plurality of hydrocarbon productive intervals penetrated by a well bore having a tubing arranged therein provided with packing means adapted to seal off the annulus between said tubing and said well bore adjacent its lower open end which comprises positioning the lower open end of said tubing above a first productive interval, lowering a wireline perforator through said tubing to adjacent said interval, perforating said first interval, removing said perforator through said tubing, lowering said tubing until said packer is positioned below said first interval, imposing fluid pressure in said annulus sufficient to fracture said first interval, relieving said fluid pressure from said annulus and then manipulating said tubing vertically until the lower open end of said tubing is positioned above a second productive interval, and then repeating said above steps at said second interval.

4. A method for selectively increasing the permeability of a plurality of hydrocarbon productive intervals penetrated by a cased well bore having a tubing arranged therein provided with packing means adapted to seal off the annulus between said tubing and said casing and burr removing means adapted to remove burrs from said perforated casing adjacent its lower open end which comprises positioning the lower open end of said tubing above a first productive interval, perforating said first interval, lowering said tubing and thereby removing said burrs until said packer is positioned below said first interval, imposing fluid pressure on said annulus sufficient to fracture said first interval, manipulating said tubing vertically to position the lower open end thereof above a second productive interval, perforating said second productive interval, lowering said tubing and thereby removing said burrs until said packer is positioned below said second productive interval and then imposing fluid pressure on said annulus sufficient to fracture said second productive interval.

References Cited in the file of this patent

UNITED STATES PATENTS

| | | |
|---|---|---|
| 2,642,142 | Clark | June 16, 1953 |
| 2,676,662 | Ritzmann | Apr. 27, 1954 |
| 2,693,854 | Abendroth | Nov. 9, 1954 |

OTHER REFERENCES

Hydraulic Fracturing, copyright 1954, the Oil and Gas Journal, Tulsa, Oklahoma, pages 29 and 55 relied on.